(12) United States Patent
Lopez Villegas et al.

(10) Patent No.: US 7,095,274 B2
(45) Date of Patent: Aug. 22, 2006

(54) SYSTEM FOR DEMODULATION OF PHASE SHIFT KEYING SIGNALS

(75) Inventors: Jose Ma. Lopez Villegas, Barcelona (ES); Josep Samatier I Marti, Barcelona (ES)

(73) Assignee: Seiko Epson Corporation, (JP)

( * ) Notice: Subject to any disclaimer, the term of this patent is extended or adjusted under 35 U.S.C. 154(b) by 0 days.

(21) Appl. No.: 11/199,581

(22) Filed: Aug. 8, 2005

(65) Prior Publication Data

US 2006/0023809 A1 Feb. 2, 2006

Related U.S. Application Data

(63) Continuation-in-part of application No. 10/942,109, filed on Sep. 15, 2004, now Pat. No. 6,975,165, which is a continuation of application No. PCT/ES02/00126, filed on Mar. 15, 2002.

(51) Int. Cl.
*H03D 3/00* (2006.01)
(52) U.S. Cl. ....................................................... 329/304
(58) Field of Classification Search ........ 329/304–310, 329/347; 331/173; 375/320, 324, 329–333
See application file for complete search history.

(56) References Cited

U.S. PATENT DOCUMENTS

| 4,021,743 | A | | 5/1977 | Claxton | 329/305 |
| 4,158,105 | A | * | 6/1979 | Otani et al. | 375/354 |
| 4,355,404 | A | | 10/1982 | Uzunoglu | 375/332 |
| 4,653,071 | A | | 3/1987 | Sgrignoli | |
| 4,715,047 | A | | 12/1987 | Hambley | 375/330 |
| 5,090,027 | A | | 2/1992 | Ohsawa | |
| 5,818,297 | A | | 10/1998 | Levionnais | |
| 2002/0167693 | A1 | | 11/2002 | Vrazel et al. | 359/109 |
| 2003/0002121 | A1 | | 1/2003 | Miyamoto et al. | 359/183 |

OTHER PUBLICATIONS

International Search Report for PCT/ES02/00126; ISA/SPTO; Mailed: May 28, 2002.

* cited by examiner

*Primary Examiner*—David Mis
(74) *Attorney, Agent, or Firm*—Harness, Dickey & Pierce, P.L.C.

(57) ABSTRACT

The invention particularly relates to a system for demodulation of PSK signals which takes advantage from the effects that the locking of resonant circuits by superharmonic injection produce, together with the interference phenomena, and more particularly it relates to a demodulation system which is designed to avoid mutual locking between said resonant circuits.

11 Claims, 5 Drawing Sheets

Fig. 1
State of the art

Fig. 2
State of the art

SYSTEM FOR DEMODULATION OF PHASE SHIFT KEYING SIGNALS

CROSS REFERENCE TO RELATED APPLICATIONS

This is a continuation-in-part application of U.S. application Ser. No. 10/942,109 filed Sep. 15, 2004, now U.S. Pat. No. 6,975,165, which is a continuation application of International application PCT/ES02/00126 filed Mar. 15, 2002, all of which are hereby incorporated by reference.

SCOPE OF THE INVENTION

This invention generally relates to a system for demodulation of phase shift keying signals (PSK), whether they are digital Binary PSK signals (BPSK), Quadrature PSK signals (QPSK) or M-ary PSK signals (MPSK).

The invention particularly relates to a system for demodulation of PSK signals which takes advantage from the effects that the locking of resonant circuits by superharmonic injection produce, together with the interference phenomena, and more particularly it relates to a demodulation system which is designed to avoid mutual locking between said resonant circuits.

The general application fields of the invention are digital communications, particularly wireless digital communications.

BACKGROUND OF THE INVENTION

The digital phase shift keying of a sinusoidal signal (PSK) is one of the most efficient modulation techniques, both in terms of noise immunity and required bandwidth. Nevertheless, the systems for demodulation of PSK signals proposed by the state of the art are quite complex. Therefore, other less efficient digital modulation schemes are usually preferred because of their simpler demodulation, for instance Frequency Shift Keying (FSK) or Amplitude Shift Keying (ASK).

Figure 1:
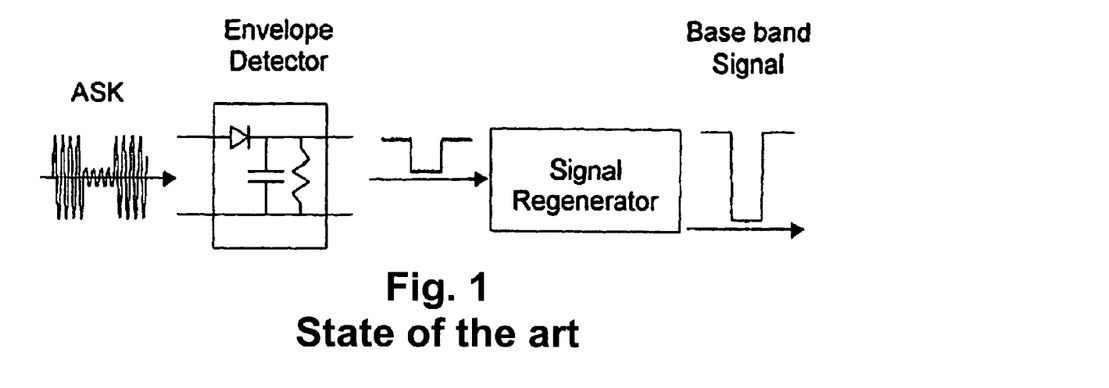
FIG. 1 is a block diagram of an arrangement used in the prior art to demodulate an ASK signal.

The simplest PSK signal is the Binary PSK signal (BPSK). In this case, the carrier phase is shifted between two possible states, 0° and 180°, according to the bit stream. BPSK signals can be easily obtained by multiplying the carrier by +1 (0° phase state) or by −1 (180° phase state). From the receiver point of view, it is impossible to know if the phase of an incoming BPSK signal corresponds to 0° state or to 180° state. This is due to the fact that the actual propagation path from the emitter to the receiver is usually unknown. To avoid this indetermination, the information to be transmitted is coded as transitions between phase states, instead of being coded as fixed phase values. Therefore, when a logic "1" has to be transmitted then the phase of the carrier signal is shifted, whereas the phase is unchanged for a logic "0", or vice versa. The signal coded in this way is known as Differential BPSK (DBPSK). It should be noted that from the signal point of view there is no difference between BPSK and DBPSK. The only difference between them is the pre-processing (at the transmitter side) or post-processing (at the receiver side) of the base-band signal. FIG. 1 shows the generation of BPSK or DBPSK signal as the product of the Base-band signal (derived from the bit stream or from the processed bit stream) and the sinusoidal carrier at the desired frequency.

The usual procedure for demodulating BPSK signals is that of coherent demodulation. Basically, the demodulation process consists of multiplying the received signal by a reference signal at the same frequency as the original carrier.

A detailed description of said coherent demodulation functioning as well as its main drawbacks are included in WO-A-03079624, property of the same assignee than the present invention, which whole content is incorporated herein by reference.

WO-A-03079624 was proposed to overcome the by then state of the art, and the invention there described presents the advantages of coherent demodulation (input signal tracking and demodulation process which is independent of the modulating signal bit period), but without the requirement for the explicit use of a frequency and phase locking loop (PLL or Costas loop). In essence, the system proposed in WO-A-03079624 is a converter of digital phase modulation (PSK) signals into digital amplitude (ASK) signals. ASK modulation is the simplest modulation scheme, both from the signal generation point of view and its demodulation, however, it is not very efficient with regards to noise immunity. The information contained in an ASK signal is transmitted by modifying the amplitude between two pre-established values. Demodulation of these signal is very simple as it only requires an envelope detector, for example, a diode and lowpass filter, followed by amplification and/or signal regeneration as necessary (FIG. 1). The simplicity of ASK signal demodulation makes it useful to have signal converters available with a more efficient modulation with respect to noise, for example, FSK or BPSK and ASK signals.

The invention proposed by WO-A-03079624 concerns to a system and method for the conversion of digital phase modulated (PSK) signals into digital amplitude modulation (ASK) signals by using a power divider with an input injected with a PSK signal, the outputs of which are connected to at least two argument/frequency dividers having each one a natural tuneable resonant frequency, the output signals of which have a phase difference depending on the phase changes of the input signal, which for example is of 0° or 180° in the case of BPSK conversion or of 90°, 180° and 270° in the case of QPSK conversion.

The argument/frequency dividers outputs are connected to the inputs of at least a power combiner, the output of which is the sum of the at least two argument/frequency dividers output signals. In the case of a BPSK to ASK converter (see FIG. 2) when the phase difference between the two signals entering the power combiner are, for example, 0°, additive interference takes place in the combiner, and when this difference is, for example, 180°, a subtractive interference occurs, so that the result is an ASK signal.

The proposed system is extrapolable to phase modulation with a greater number of symbols, not only to the mentioned QPSK signals but also to M-PSK modulation.

The explanation of the argument/frequency dividers locking phenomenon of both frequency and phase of its circuits when injected with a signal having a frequency close to the second harmonic of its fundamental resonant frequency, which are the principles in which said invention (and also the present invention) are based, is included in the WO-A-03079624 description, which, as it was said above, is wholly incorporated herein by reference.

Although the proposal of WO-A-03079624 represented a step forwards from the state of the art, its performances and results can be enhanced particularly with respect to avoid mutual locking between the argument/frequency dividers of the converter proposed, something that the power combiners there utilized don't successfully achieve, and also with respect to obtain a complete conversion to base band, i.e. the demodulation of the PSK signals, without the needing of additional circuitry (such as the mentioned envelope detector), and not only its conversion to ASK signals.

SUMMARY OF THE INVENTION

The present invention concerns to a system for demodulation of phase shift keying signals, or PSK signals, of the type which comprises some elements in common with said proposal of WO-A-03079624, which are:

a power divider with an input to be injected with a PSK signal at a predetermined frequency which is the same as the frequency of a carrier signal, and with an even number M of outputs, from which corresponding signals are obtained, one per output, at equal frequency and phase than said PSK signal, argument/frequency dividers, generally injected locked oscillators (ILOs), which are equal in number to said power divider outputs, each argument/frequency divider having an input respectively connected to one of said output power divider outputs to receive said signals and having, each one, a natural tuneable resonant frequency close to half said output power divider signals frequency, and one output from which output signals are obtained, one per argument/frequency divider, whose phases change differently from each other when a phase change in the PSK signal is produced, and an output stage with inputs connected at least to said argument/frequency dividers outputs, for treating said output signals.

The system proposed by the present invention differs from the proposed by WO-A-03079624 in that alternatively to using a power combiner in said output stage, it has an output stage which is adapted to isolate said argument/frequency dividers outputs in order to avoid mutual locking between said argument/frequency dividers, for which it comprises at least M-1 devices acting at least as analogue multipliers providing at their outputs M-1 signals each of them containing at least harmonic components of one of the M-1 base-band signals which were used to modulate said PSK signal.

Any person skilled in the art knows that if said mutual locking between said ILOs happened, they would malfunction and thereby the PSK demodulation couldn't be produced.

Suitable filters are also included in said output stage to recover said base band signal, or signals, as well as possible, and so complete the demodulation of said PSK signal without the need of using additional circuits.

Those filters can be part of said device, or devices, which act as analogue multipliers, or be external to them and connected to their outputs.

Those devices which act at least as analogue multipliers are preferably those which are commonly denominated "mixers" which properties referred to isolation between their inputs to avoid said mutual locking of the ILOs connected thereto are much better than those of a power combiner, as any person skilled in the art knows, being quite normal to find in the market mixers with an isolation between their inputs about 15 dB higher than typical combiners inputs isolation.

In order to even improve more said isolation between the argument/frequency dividers, for some embodiments, the system proposed comprises several of those mixers connected interspersed between different electrical paths between the input (or inputs) and the output (or outputs) of the system or demodulator proposed, being said paths responsible of electrically space out said ILOs outputs, and thereby contribute to said isolation and avoidance of said mutual locking.

So the effects of using mixers alternatively to power combiners or mixers with said several electrical paths, are basically two:

the mentioned avoiding of mutual locking between the ILOs connected to their inputs, what is even improved, as mentioned above, by the use of said different electrical paths for some embodiments, and the direct pass to base band, i.e. the demodulation of the PSK signals without passing through an intermediate conversion to ASK signals.

With the present invention it is possible to directly demodulate M-ary PSK signals in a simple and secure way, by an arrangement that guarantees the correct operation of the elements which form part of the system, with just a few number of electronic components.

DETAILED DESCRIPTION OF AN EMBODIMENT

Figure 2:
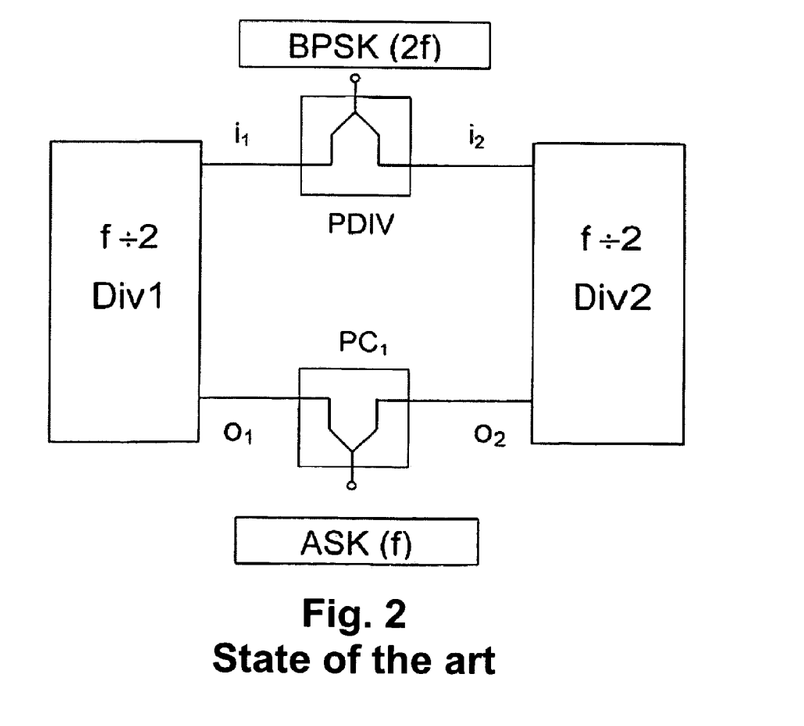
FIG. 2 is a diagram of a BPSK to ASK converter according to the closest prior art represented by WO-A-03079624.

FIGS. 1 and 2 deal with the state of the art and have already been described in the background section and also in WO-A-03079624, which, as already said above, is wholly included herein by reference.

The present invention concerns to a system for demodulation of phase shift keying signals, or PSK signals, whether they are BPSK, QPSK or any MPSK signals.

Figure 3:
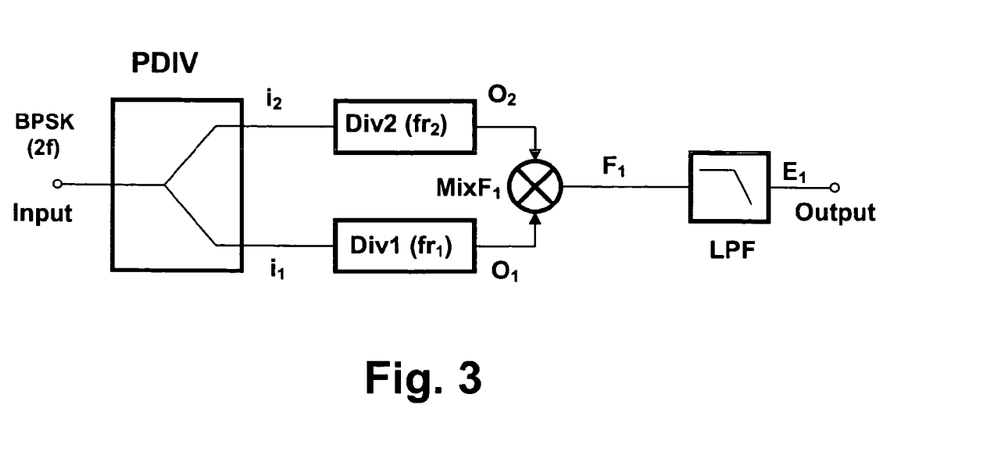
FIG. 3 shows a block diagram of an arrangement of the system proposed by the present invention, for an embodiment, for demodulating a BPSK signal.
Figure 7:
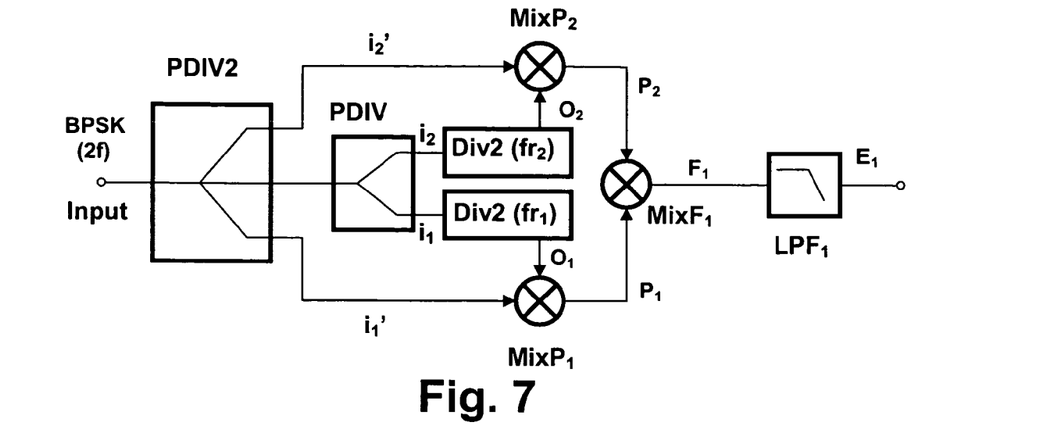
FIG. 7 shows a block diagram of an arrangement of the system proposed by the present invention, for another embodiment, for demodulating a BPSK signal by using different electrical paths.

The arrangements illustrated by FIGS. 3 and 7 refers to embodiments of the system proposed by the present invention for demodulating BPSK signals, and correspond to the simplest possible arrangements to simplify the description and explanation of the invention, but they completely extrapolable to MP^SK demodulators, by using the same elements only increased in number and connected properly.

The diagram shown in FIG. 3 comprises the following sections:

a power divider PDIV with an input injected with a BPSK signal at a predetermined frequency $2f$, where f is half the carrier signal frequency, and with two outputs from which corresponding signals $i_1$, $i_2$ are obtained, one per output, at equal amplitude and frequency $2f$ than said BPSK signal. In addition, the two signals $i_1$ and $i_2$ are in the same phase state, which may be the same as the input BPSK signal or with a certain phase imbalance or delay that is the same for both. This power divider PDIV may be either passive or active. In all cases, it must provide sufficient isolation between the two output signals $i_1$ and $i_2$.

two argument/frequency dividers $Div_1$, $Div_2$, generally injected locked oscillators (ILOs), injected with said signals $i_1$, $i_2$ and having, each one, a natural tuneable resonant frequency $fr_1$, $fr_2$ close to half said output power divider signals frequency $2f$, and providing output signals $O_1$, $O_2$ at a frequency f which is half the injected signal frequency $2f$, and whose phases change differently from each other when a phase change in the BPSK signal is produced. Said phase of signals $O_1$ and $O_2$ is fixed by signals $i_1$ and $i_2$, so that it can only take on one of two possible values having a difference of 180°. As a result, and taking into account that the injected signals $i_1$ and $i_2$ are identical, the output signals $O_1$ and $O_2$ will be either identical (in phase) or one will be an inverted copy of the other (180° out of phase), with both situations being equally probable.

Figure 4:
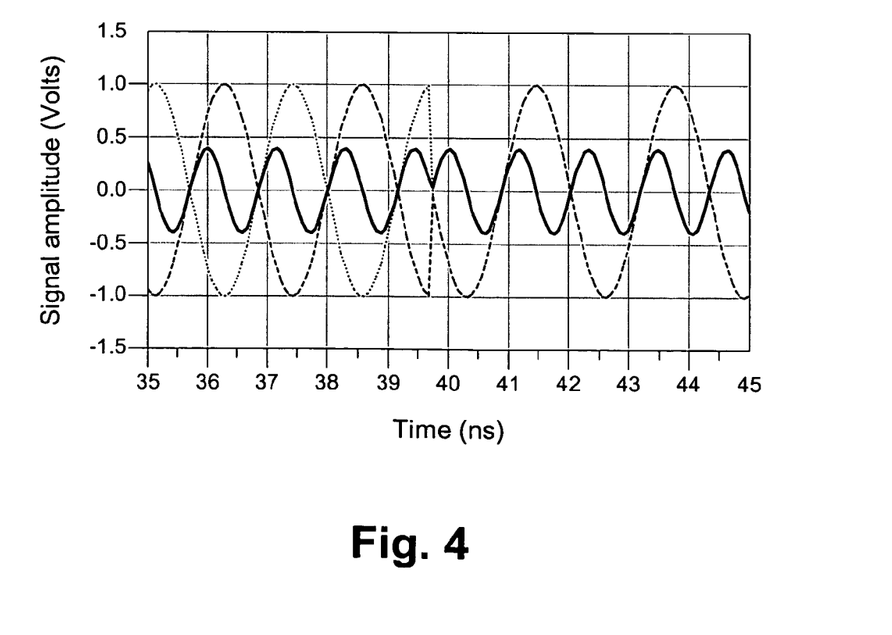
FIG. 4 shows the time domain waveforms of the input signal of the system represented by FIG. 3, which is a BPSK signal which changes once its phase, and of ILOs output signals in response to said BPSK signal.

FIG. 4 shows the time domain waveforms of the injected BPSK signal (continuous line), argument/frequency dividers output signals $O_2$ (dotted line) and $O_1$ (dashed line) around one of the times at which the input phase changes. Note that the phase change in 180° of BPSK signal induces a phase change in 90° in $O_2$ signal and −90° in $O_1$ signal. Consequently, $O_2$ and $O_1$ signals, originally in counter phase, become in phase after the phase change of the BPSK signal injected at the Input terminal of the arrangement, or demodulator, shown in FIG. 3.

Said argument/frequency dividers Div1, Div2 are substantially identical, producing architectural symmetry and determining that their output signals $O_1$, $O_2$ are equal in both power and frequency Said sections described above are also described in WO-A-03079624, and therefore are not what characterizes the present invention.

The characteristic part of the present invention is that alternative to just summing said argument/frequency dividers output signals $O_1$ and $O_2$ by using a power combiner (as in WO-A-03079624), a different kind of output stage is proposed which assures that mutual locking between said argument/frequency dividers $Div_1$, $Div_2$ is not produced, and also than a complete demodulation of the PSK signal is accomplished.

That's achieved by using an output stage with inputs connected at least to said argument/frequency dividers outputs, for treating their output signals $O_1$, $O_2$, which adapted to isolate said argument/frequency dividers outputs in order to avoid mutual locking between said argument/frequency dividers $Div_2$, $Div_2$.

Figure 5:
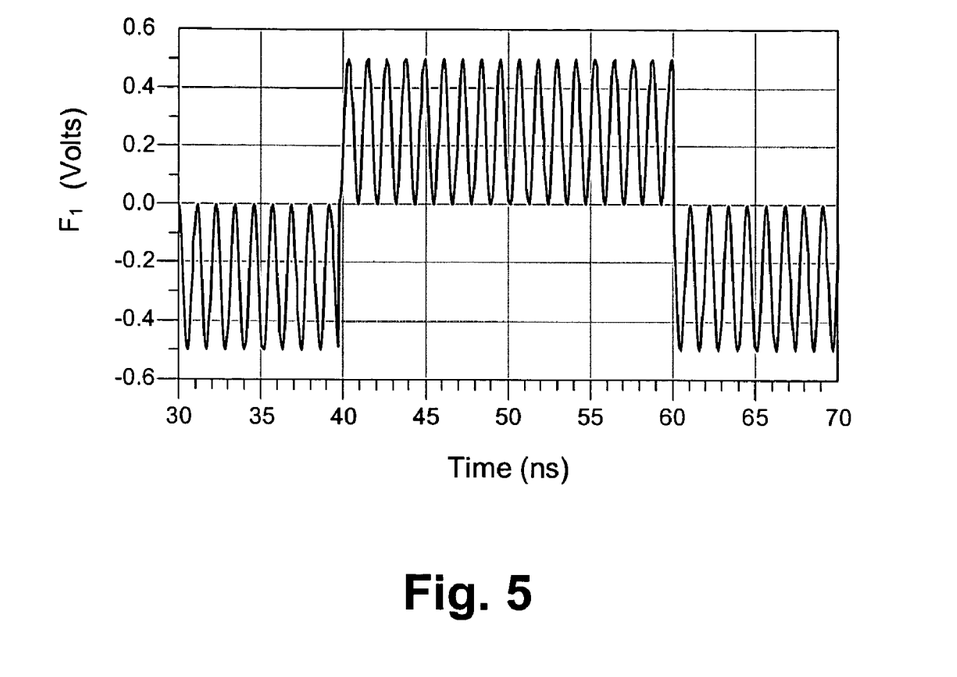
FIG. 5 shows the time domain waveform of the output signal of the mixer illustrated in FIG. 3, in response to two consecutive phase changes of the input BPSK signal.

For that purpose, for the embodiment illustrated by FIG. 3 said output stage comprises one device $MixF_1$ acting at least as analogue multipliers, which has two inputs connected each one to each of said argument/frequency dividers outputs, in order to at least multiply said argument/frequency dividers output signals $O_1$, $O_2$, for providing a signal $F_1$ which contains at least harmonic components of the base-band signal used to modulate said BPSK signal, and which is represented by FIG. 5. Said $F_1$ signal is ideally the analogue product of $O_2$ and $O_1$.

As in can be seen in FIG. 3, the arrangement there illustrated also comprises a low pass filter $LPF_1$ for filtering said signal $F_1$ represented in FIG. 5, in order to provide at its output a signal $E_1$ which contains substantially only said harmonic components of the base-band signal. Said $E_1$ signal is represented by FIG. 6, and is the signal finally provided by the demodulator represented in FIG. 3, at its Output terminal.

Figure 6:
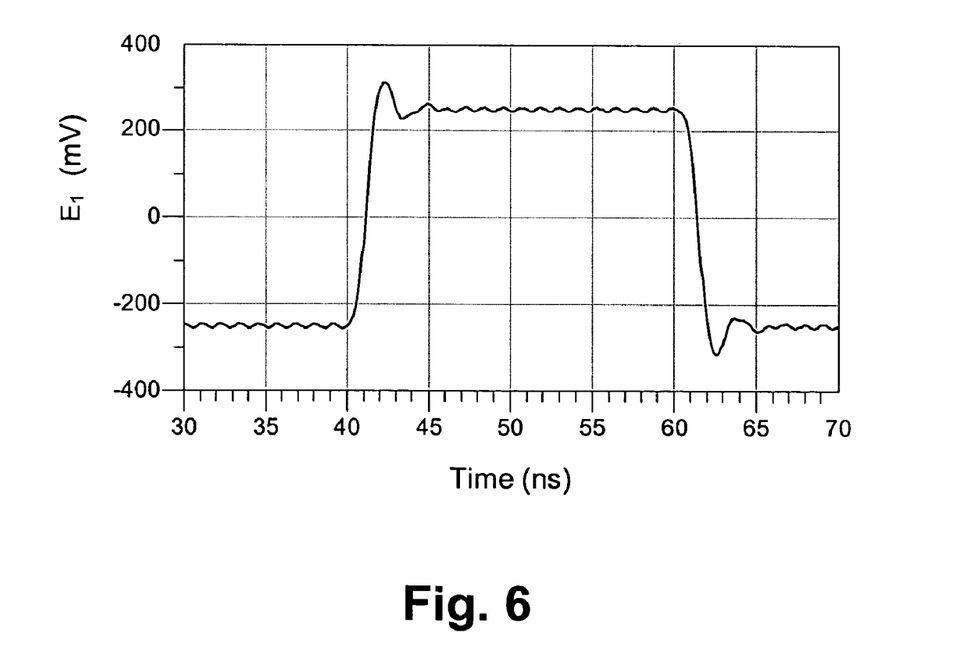
FIG. 6 shows the time domain waveform of the output signal of the low pass filter illustrated in FIG. 3, i.e. of the system output signal, which corresponds to the base band signal used to modulate said BPSK signal, for the same period of time represented in FIG. 5.

The response to two consecutive phase changes of the input BPSK signal is observed in both FIGS. 5 and 6.

FIG. 7 illustrates a further arrangement representative of another embodiment of the present invention. It comprises all the elements of FIG. 3 arrangement, but it offers additional isolation to the argument/frequency dividers outputs.

For achieving said additional isolation it comprises an additional power divider PDIV2 with an input to be injected with the same BPSK signal injected to said power divider PDIV, and with two outputs, from which corresponding output signals $i'_1$, $i'_2$, equal to said power divider output signals $i_1$, $i_2$, are obtained, one per output.

The output stage of the arrangement of FIG. 7 comprises two additional devices $MixP_1$, $MixP_2$ equal to said device $MixF_1$.

As it can be observed in FIG. 7, each of said two additional devices $MixP_1$, $MixP_2$ has one of their inputs connected to one of the outputs of the argument/frequency dividers $Div_1$, $Div_2$, and the other input connected to one of the outputs of said additional power divider PDIV2 in order to at least multiply, each of said additional devices $MixP_1$, $MixP_2$, one of said argument/frequency dividers output signals $O_1$, $O_2$ per one of said additional power divider output signals $i'_1$, $i'_2$, providing two output signals $P_1$, $P_2$ as a result of said multiplications.

To analyse the response of this demodulator illustrated by FIG. 7, the same previous BPSK signal and the same argument/frequency dividers output signals $O_2$ and $O_1$, whose time domain waveforms are shown in FIG. 4, are used.

Figure 8:
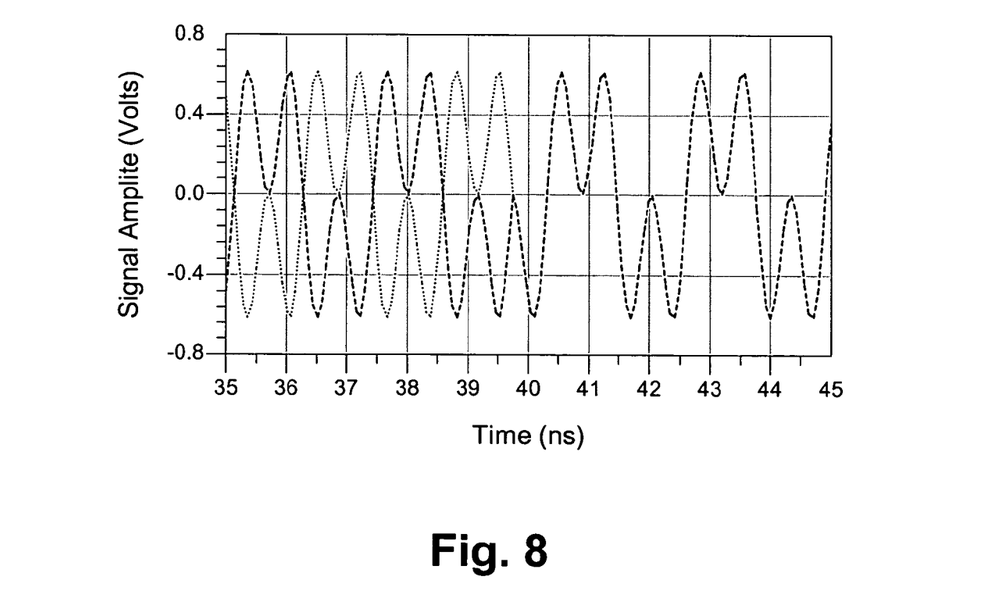
FIG. 8 shows the time domain waveforms of the output signals of the mixers connected to the ILOs outputs of the arrangement of the system represented by FIG. 7, in response to the same BPSK signal represented in FIG. 3.

FIG. 8 shows the time domain waveforms of signals $P_2$ (dotted line) and $P_1$ (dashed line), which are ideally just the product between the BPSK signal injected at the Input terminal and signals $O_2$ and $O_1$, respectively.

Figure 9:
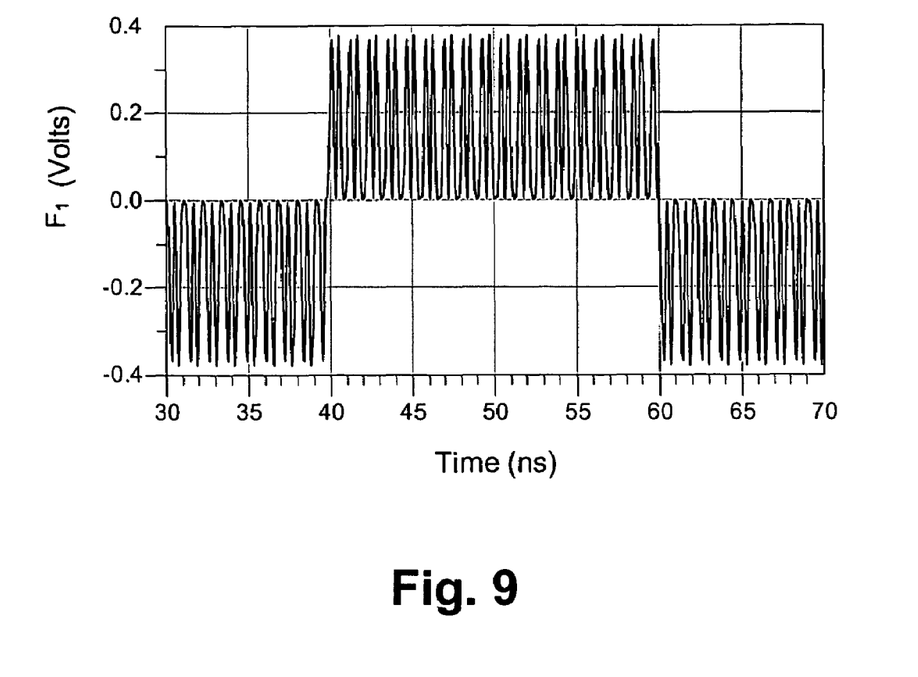
FIG. 9 shows the time domain waveform of the output signal of the output mixer illustrated in FIG. 7, in response to two consecutive phase changes of the input BPSK signal.

The demodulator shown in FIG. 7 has also one of said devices $MixF_1$ whose two inputs are connected, respectively, to said two additional devices outputs, in order to at least multiply said output signals $P_1$, $P_2$ coming there from, for providing said signal $F_1$ which contains at least said harmonic components of the base-band signal used to modulate the BPSK injected signal, and which is represented by FIG. 9. Said $F_1$ signal is ideally the analogue product of $P_2$ and $P_1$.

Like the demodulator of FIG. 3, as in can be seen in FIG. 7, the arrangement there illustrated also comprises a low pass filter $LPF_1$ for filtering said signal $F_1$ represented in FIG. 9, in order to provide at its output a signal $E_1$ which contains substantially only said harmonic components of the base-band signal. Said $E_1$ signal is represented by FIG. 10, and is the signal finally provided by the demodulator represented in FIG. 7, at its Output terminal.

Figure 10:
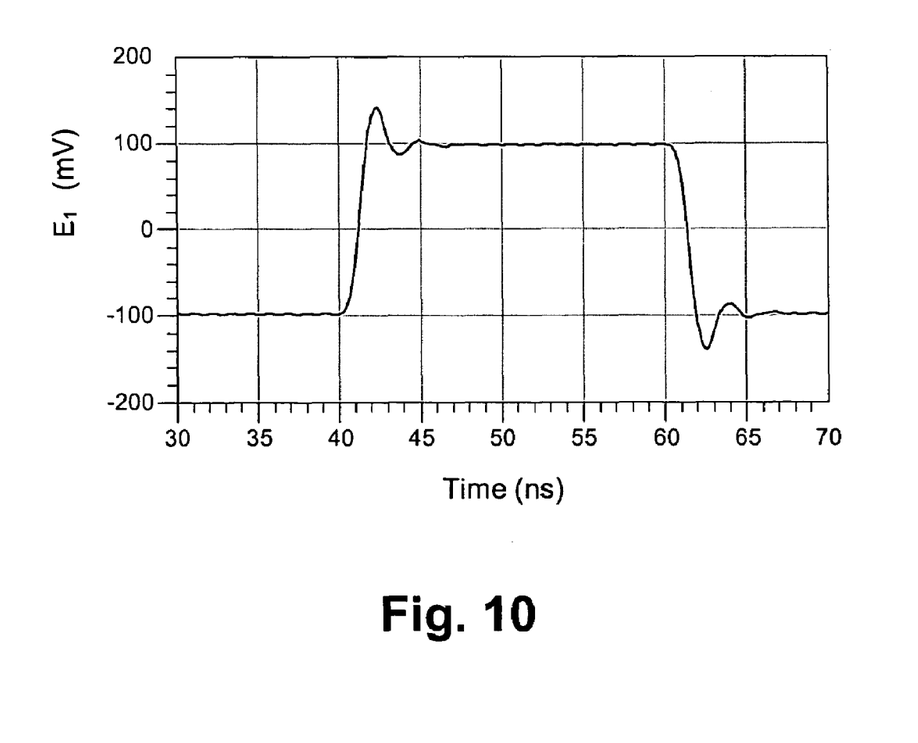
FIG. 10 shows the time domain waveform of the output signal of the low pass filter illustrated in FIG. 7, i.e. of the system output signal, which corresponds to the base band signal used to modulate said BPSK signal, for the same period of time represented in FIG. 9.

The response to two consecutive phase changes of the input BPSK signal is observed in both FIGS. 9 and 10.

Although is not shown in FIG. 7 the circuit there represented could further include additional filters at said additional devices outputs, in order to properly filter said signals $P_1$, $P_2$ prior to be multiplied by $MixF_1$.

It could be possible, for another embodiment, to slightly modify the arrangement of FIG. 7 by dispensing with said additional power divider PDIV2, and delivering said signals $i'_1$, $i'_2$ to said additional devices $MixP_1$, $MixP_2$ directly from said power divider PDIV.

Although for the embodiments illustrated by FIGS. 3 and 7 the low pass filters $LPF_1$ has been represented as an independent block external to said device $MixF_1$, for other embodiments (not shown) it could be part of it, acting therefore said device $MixF_1$ as a multiplier and also as a low pass filter.

Generally said device $MixF_1$ and said additional device $MixP_1$ are what are commonly known by mixers.

As has already said above the preferred embodiments explained refer to the demodulation of BPSK signals, but can be perfectly extrapolated to the demodulation of MPSK signals, as follows:

for an equivalent embodiment to the one illustrated in FIG. 3 the MPSK demodulator would be differentiated from it in that it would have:

M argument/frequency dividers $Div_1 \ldots Div_M$ with their inputs connected to respective M outputs of the power divider PDIV, M-1 of said devices, or mixers, $MixF_1 \ldots MixF_{M-1}$, and M-1 low pass filters $LPF_1 \ldots LPF_{M-1}$, each of them providing at their outputs one of M-1 signals $E_1 \ldots E_{M-1}$, each of them representative of one of M-1 base-band signals used to modulate said MPSK signal.

for an equivalent embodiment to the one illustrated in FIG. 7 the MPSK demodulator would be differentiated from it in that it would have:

M argument/frequency dividers $Div_1 \ldots Div_M$ with their inputs connected to respective M outputs of the power divider PDIV, M of said additional devices, or mixers, $MixP_1 \ldots MixP_M$ with one of their inputs connected to respective M outputs of the additional power divider PDIV2, and the other input connected to one of said M argument/frequency dividers outputs, M-1 of said devices, or mixers, $MixF_1, \ldots MixF_{M-1}$, each one with their inputs connected to the outputs of two of said additional devices $MixP_1 \ldots MixP_M$, and M-1 low pass filters $LPF_1 \ldots LPF_{M-1}$, each of them providing at their outputs one of M-1 signals $E_1 \ldots E_{M-1}$, each of them representative of one of M-1 base-band signals used to modulate said MPSK signal.

For example if any of the two arrangements described just above would be injected, at their Input terminal, with a signal with quadrature phase shift keying, or QPSK, modulation, the system would perform a demodulation of it to finally obtain three signals, at their Output terminals, each of them containing at least harmonic components of the three base-band signals which were used to modulate said QPSK signal.

A person skilled in the art could modify the embodiments described without departing from the true spirit and scope of the invention as defined in the appended claims.

The invention claimed is:

1. A system for demodulation of phase shift keying signals, or PSK signals, of the type which comprises:

a power divider (PDIV) with an input to be injected with a PSK signal at a predetermined frequency ($2f$) which is the same as the frequency of a carrier signal, and with an even number M of outputs, from which corresponding signals ($i_1 \ldots i_M$) are obtained, one per output, at equal frequency ($2f$) and phase as said PSK signal, argument/frequency dividers ($Div_1 \ldots Div_M$) equal in number (M) to said power divider outputs, each argument/frequency divider ($Div_1 \ldots Div_M$) having an input respectively connected to one of said M output power divider outputs to receive said signals ($i_1 \ldots i_M$) and having, each one, a natural tuneable resonant frequency ($fr_1 \ldots fr_M$) close to half said output power divider signals frequency ($2f$), and one output from which output signals ($O_1 \ldots O_M$) are obtained, one per argument/frequency divider ($Div_1 \ldots Div_M$), whose phases change differently from each other when a phase change in the PSK signal is produced, and an output stage with inputs connected at least to said argument/frequency dividers outputs, for treating their output signals ($O_1 \ldots O_M$), wherein said output stage is adapted to isolate said argument/frequency dividers outputs in order to avoid mutual locking between said argument/frequency dividers ($Div_1 \ldots Div_M$), for which it comprises at least M-1 devices ($MixF_1 \ldots MixF_{M-1}$) acting at least as analogue multipliers providing at their outputs M-1 signals ($F_1 \ldots F_{M-1}$) each of them containing at least harmonic components of one of the M-1 base-band signals which were used to modulate said PSK signal.

2. A system as claimed in claim 1, wherein said output stage comprises only M-1 of said devices ($MixF_1 \ldots MixF_{M-1}$) each one having two inputs each connected to one of said argument/frequency dividers outputs, in order to at least multiply, each device, two of said argument/frequency dividers output signals ($O_1 \ldots O_M$), for providing said M-1 signals ($F_1 \ldots F_{M-1}$) which contain at least said harmonic components of one of the M-1 base-band signals.

3. A system as claimed in claim 1, further comprising an additional power divider (PDIV2) with an input to be injected with the same PSK signal injected to said power divider (PDIV), and with the same number of M outputs, from which corresponding output signals ($i'_1 \ldots i'_M$), equal to said power divider output signals ($i_1 \ldots i_M$), are obtained, one per output.

4. A system as claimed in claim 3, wherein said output stage comprises M additional devices ($MixP_1 \ldots MixP_M$) equal to said M-1 devices ($MixF_1 \ldots MixF_{M-1}$), each device having two inputs and one output, being:

each of said M additional devices ($MixP_1 \ldots MixP_M$) with one of their inputs connected to one of said M argument/frequency dividers outputs and the other input connected to one of said M additional power divider outputs in order to at least multiply, each of said additional devices ($MixP_1 \ldots MixP_M$), one of said argument/frequency dividers output signals ($O_1 \ldots O_M$) per one of said additional power divider output signals ($i'_1 \ldots i'_M$), and each of said M-1 devices with their two inputs connected, respectively, to two outputs of two of said M additional devices ($MixP_1 \ldots MixP_M$), in order to at least multiply signals ($P_1 \ldots P_M$) coming there from, for providing said M-1 signals ($F_1 \ldots F_{M-1}$) which contain at least said harmonic components of one of the M-1 base-band signals.

5. A system as claimed in claim 1, wherein said argument/frequency dividers ($Div_1 \ldots Div_M$) are injected locked oscillators, or ILOs.

6. A system as claimed in claim 1 wherein said output stage also comprises at least M-1 low pass filters ($LPF_1 \ldots LPF_{M-1}$) for filtering said M-1 signals ($F_1 \ldots F_{M-1}$) which contain at least harmonic components of one of said M-1 base-band signals, in order to provide at their outputs M-1 signals ($E_1 \ldots E_{M-1}$) each of them containing substantially only said harmonic components of one of the M-1 base-band signals.

7. A system as claimed in claim 6, wherein said at least M-1 filters ($LPF_1 \ldots LPF_{M-1}$) are comprised in said devices ($MixF_1 \ldots MixF_{M-1}$).

8. A system as claimed in claim 4, wherein said M-1 devices ($MixF_1 \ldots MixF_{M-1}$) and/or said M additional devices ($MixP_1 \ldots MixP_M$) are mixers.

9. A system as claimed in claim 1, wherein the number of outputs, M, from said power divider (PDIV) is equal to two so that the system performs a demodulation of a signal with binary phase shift keying, or BPSK, modulation, to finally obtain one signal containing at least harmonic components of the base-band signal which was used to modulate said BPSK signal.

10. A system as claimed in claim 1, wherein the number of outputs, M, from said power divider PDIV is equal to four so that the system performs a demodulation of a signal with quadrature phase shift keying, or QPSK, modulation, to finally obtain three signals each of them containing at least harmonic components of the three base-band signals which were used to modulate said QPSK signal.

11. A system as claimed in claim 1, wherein said argument/frequency dividers ($Div_1 \ldots Div_M$) are identical, producing architectural symmetry and determining that their output signals ($O_1 \ldots O_M$) are equal in both power and frequency.

\* \* \* \* \*